(12) United States Patent
Harvey

(10) Patent No.: US 6,476,947 B1
(45) Date of Patent: Nov. 5, 2002

(54) PROCESS AND APPARATUS FOR MAXIMIZING A SOFTWARE COMPONENT AND MINIMIZING A HARDWARE COMPONENT OF AN INFRARED CODE

(76) Inventor: Michael Lee Harvey, 306 Live Oak Dr., Danville, CA (US) 94506

(*) Notice: Subject to any disclaimer, the term of this patent is extended or adjusted under 35 U.S.C. 154(b) by 0 days.

(21) Appl. No.: 09/072,192

(22) Filed: May 4, 1998

(51) Int. Cl.7 ............................................. H04B 10/00
(52) U.S. Cl. ...................................................... 359/142
(58) Field of Search ................................ 359/142, 148; 348/734; 710/73, 46, 48

(56) References Cited

U.S. PATENT DOCUMENTS

| | | | | |
|---|---|---|---|---|
| 4,593,414 A | * | 6/1986 | Koyanagi | 455/186 |
| 4,718,112 A | * | 1/1988 | Shinoda | 455/151 |
| 5,255,313 A | * | 10/1993 | Darbee | 379/102 |
| 5,774,063 A | * | 6/1998 | Berry et al. | 340/825.69 |

* cited by examiner

Primary Examiner—Jason Chan
Assistant Examiner—Dalzid Singh
(74) Attorney, Agent, or Firm—Aileen Champion Addessi

(57) ABSTRACT

A process for minimizing the software component and maximizing the hardware component of an infrared code includes separating the software component from the hardware component. The software component may be stored in memory, on a disk, accessed through a remote server, stored on the hard drive of a microprocessor, or the like. The hardware component may be implemented as a simple peripheral device, an outboard integrated circuit or imbedded within a processor or on a PC motherboard. The variable IR data, such as the bit modulation technique, the function data, and the protocol data, are stored in the software component. The software component configures and controls each IR transmission. The hardware component, which transmits the IR light for sending the infrared code, includes a pair of carrier cycle registers, a pair of bit modulation registers, and buffers to enable synchronous loading of frequency, duty cycle, cycle data, and wait time sent from the software component.

8 Claims, 3 Drawing Sheets

PROCESS AND APPARATUS FOR MAXIMIZING A SOFTWARE COMPONENT AND MINIMIZING A HARDWARE COMPONENT OF AN INFRARED CODE

BACKGROUND OF THE INVENTION

The invention relates to remote controls and, more particularly, to the transmission of infrared (IR) control signals.

Currently, native remote controls, those that are delivered with the device they control, and universal remote controls, those either delivered with the device or available from third party providers, hold both the data and the hardware-dependent driver components for the IR control code in software in the local memory, resident within a single microprocessor integrated circuit. Upon command from the user to send a specific IR signal (occurring when the user presses a key on the remote control), the application software resident in the microprocessor moves the specific data control bytes from the internal memory to an internal register (the IR data register) which holds the IR data to be sent. Subsequently, the microprocessor's application software generates the timing that sends the contents of the IR data register configured in the specific protocol required, out from one of the I/O pins, through an IR amplifier (which may be simply a pin driver inside the microprocessor or a transistor switch outside the microprocessor) and through the IR LED which converts the electrical signals into infrared light.

However, for future use, as the personal computer (PC) migrates into the family entertainment area and as the volume of data available to be stored in a universal remote control increases, making it more difficult to hold all IR codes in one, relatively small, memory, it becomes important to find a way in which the PC can be used to send IR control signals, too. For this application, it will be important to maximize the software component, where possible, and minimize the hardware component. The PC comes equipped with a large memory, a hard disk drive memory and other memory components far larger than that found in an infrared remote control. The reduced hardware will be cheaper to manufacture, reducing the cost of the ultimate product to the consumer. The separation is possible because all IR signals possess the same three elements. These three elements are the cycle frequency (or none) and its duty cycle (or single pulse width), the cycle transmit duration (or cycle count) of a carrier cycle burst, and the wait time before the start of a new carrier cycle burst (or pulse or no wait time). When these few characteristics are alone embodied in the hardware and the rest of the information is stored within the PC, then the hardware has been fully minimized and the software has been fully maximized. Furthermore, if the hardware is structured during the minimization process to retain these three elements, then it is very likely that the minimized hardware will correctly transmit any future IR signals that designers create, thus affording the technology a long life.

Therefore, an apparatus and method for transmitting IR control signals is needed which separates the control data words and the varying characteristics of the signal transmission itself from the actual hardware used in transmitting the IR signal, increasing the software component to hold the variable data in an IR signal and reducing the hardware component to hold only those elements of an IR signal that rarely, if ever, vary.

SUMMARY OF THE INVENTION

A process for maximizing a software component and minimizing a hardware component of an IR signal begins with the step of separating the software component from the hardware component by storing in software the variable data component of any and all IR signals.

The process further includes the development of a hardware component able to receive and store a minimum data set necessary to faithfully replicate any and all IR signals. At a minimum, the data set includes the frequency of a carrier (or no frequency, if no carrier is involved in the IR signal), the carrier duty cycle (or pulse width, if no carrier is involved in the IR signal), the carrier duration (in time or number of cycles, if any), and the wait time before a subsequent carrier burst and pulse is to be issued (or none).

The process finally includes the step of loading at least the minimum data set into the hardware component by the software component. This step includes the initiation of the IR signal by the hardware component when a first data set is loaded. It may also include the preloading by the software component of at least one buffer in the hardware component while an IR signal is in process to ensure IR signal continuity.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

The invention described herein provides an apparatus and method for separating an infrared code into a maximum software component and a minimum hardware component for use within a personal computer (PC) environment or other similar environment.

Figure 1:
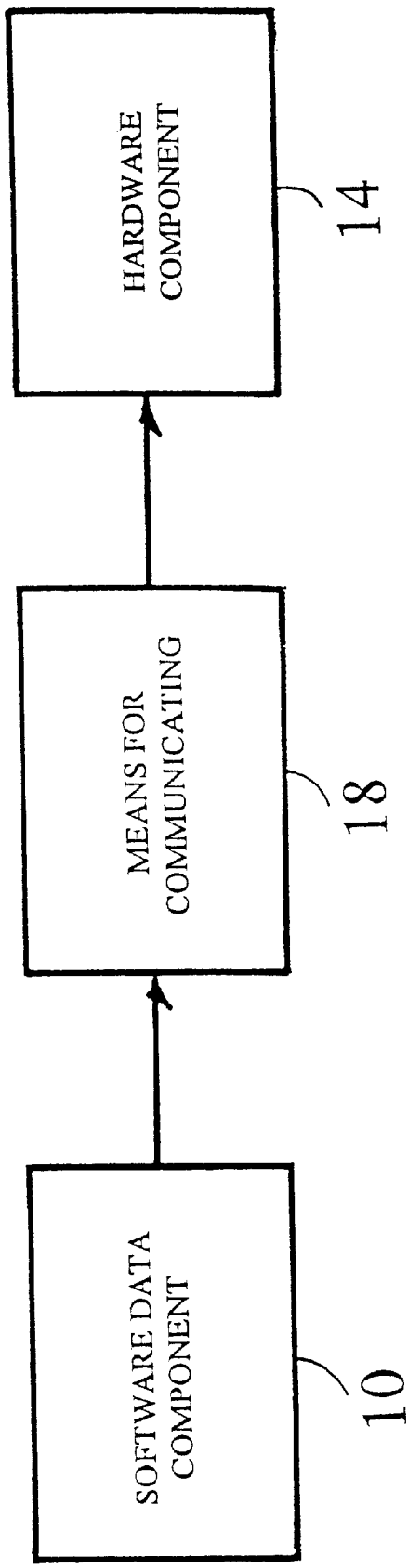
FIG. 1 is a block diagram of a system for maximizing a software data component and minimizing a hardware component of an infrared code.

Referring to FIG. 1, a block diagram illustrates a software component 10 which is separate from a hardware component 14. A means for communicating 18 enables the software component 10 to control the hardware component 14.

Figure 2:
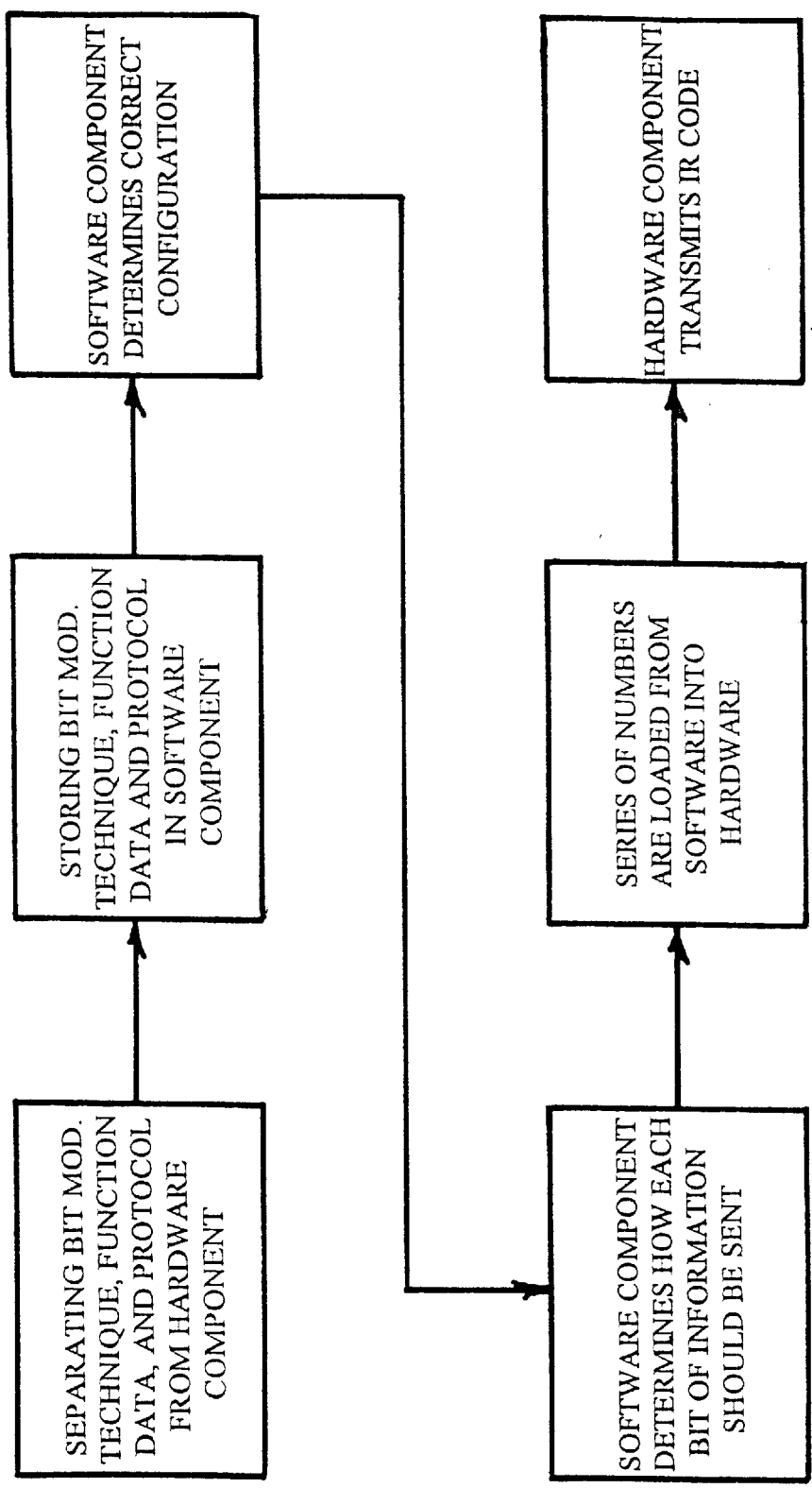
FIG. 2 is a flow chart of the system.

Referring to FIG. 2, a process for controlling the hardware component 14 with the separate software component 10 is illustrated with a flow chart. The software and hardware components of a consumer infrared code are separated so that variable data, such as the bit modulation technique, function data and protocol are stored in the software component 10 and not within the hardware component 14. The protocol holds variable information concerning the transmission frequency, duty cycle, configuration of the function data, the number of times the signals are repeated and any other special characteristics of the IR transmission, including start or stop data, AGC bursts, and the length and character of stop bits. The software component 10 configures and controls each IR transmission. The software determines the correct configuration and how each bit of information should be sent by the data it holds in memory.

The hardware component 14 is controlled by the software operating in the host processor. This software configures and controls each IR transmission. The IR transmission is defined as a complete IR communication, usually sent between the time a remote control button is pressed and the time it is released, regardless of how long the key is pressed.

The software determines the correct configuration and how each bit of information should be sent by the data it holds in memory, including the bit modulation technique, the function data, and the protocol. This software process of configuring the data, then results in a series of numbers that are to be loaded into the specialized hardware component 14 that then sends a specific IR signal.

One embodiment might be found in a multimedia PC. The hard, floppy, or CD-ROM disk drive would contain the application software and the variable IR signal data, such as the control data words, the signal transmission characteristics, and the like. As other examples, the software may be contained on a remote server, accessed through the Internet, or the like. The hardware to generate the electrical infrared signals may be a peripheral device, or found on the PC motherboard, or contained within the main processor itself, or the like. When commanded, the application software invokes the lower level software drivers. These drivers, in turn, fetch the variable data and feed it into the specialized hardware for transmission.

A small, finite set of unique infrared signatures can replicate the whole repertoire of infrared commands. The control data word is therefore, easily blended bit by bit with the signal transmission characteristics by the software in the PC. The blended data is sent to the hardware, which then may communicate its status back to the software system as the IR data is transmitted. The software continues to assemble the string of IR data, sending them to the minimized hardware until the whole infrared transmission is sent.

The minimized hardware receives and then transmits each infrared blended data, which is described in the fully minimized approach as only five or six bytes of data. The blended data consists of the following:

TABLE 1

| DATA TYPE | NUMBER OF BYTES | DESCRIPTION |
| --- | --- | --- |
| Cycles | 2 | Number of cycles to send. Can be zero, one or many. |
| Wait | 2 | Wait time after the cycles are sent. If Cycles are zero, then Wait is invoked immediately. Wait can be zero. |
| Frequency | 1 or 2 | Frequency at which the Cycles are sent. The duty cycle (or pulse width) is inherently contained in this data, or can be held specifically in a second byte. |

The data can be passed to the hardware component 14 in serial or parallel format. In a parallel hardware implementation, there would be 12 signals pins plus two power pins. For example, the signal pins would include Clock (the base clock frequency), Byte in (8 bits of data), Data strobe (loads each date byte, or bit, if serial), Empty (a signal from the hardware indicating its registers are empty), and IR out (the output signal). The power pins would include VDD (+power) and VSS (ground).

In a serial implementation, the overall pin count is reduced from 14 to eight (serial in, serial out, serial clock, IR out, power, empty, clock, and ground). In both serial and parallel implementations, internal logic would control the loading of the registers, the sending of the infrared signal, and the generation of the Empty control signal.

This logic can be added to the PC processor, for the most cost-effective solution. The only new requirement is the addition of one I/O pin to the processor chip for the IR out signal. The other signals would already be available on the chip such as the power signals, or be generated internally, and would not require external pins.

Figure 3:
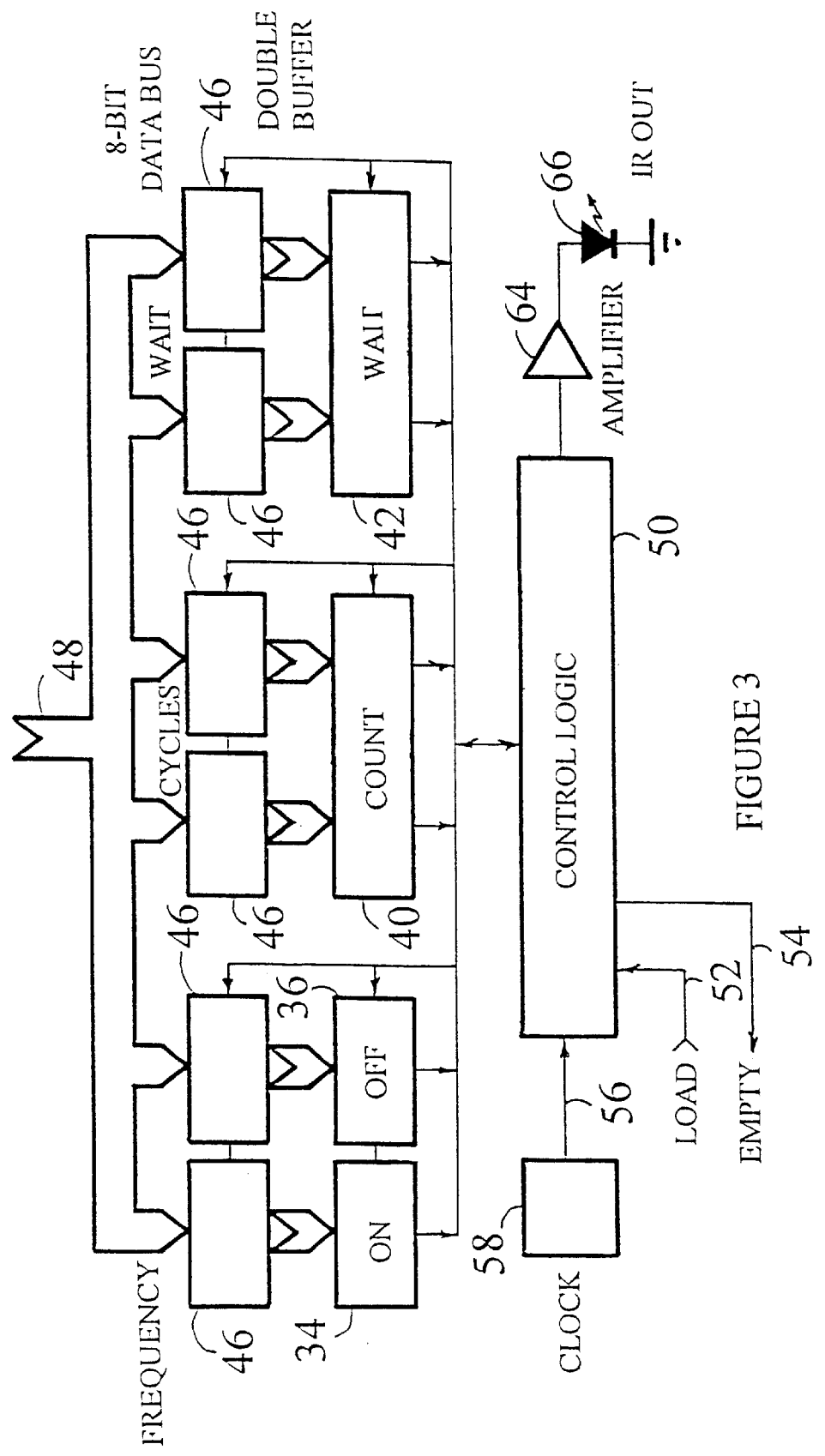
FIG. 3 is a schematic diagram of one possible implementation of the hardware component.

Referring to FIG. 3, the hardware component 14 to carry out the IR transmission includes a first 16-bit register pair which creates one carrier cycle and is referred to as the carrier cycle register pair. The carrier cycle register pair includes a first 8-bit counting register 34 or ON register and a second 8-bit counting register 36 or OFF register.

The hardware component 14 includes a second register pair which controls how the carrier cycle register pair operates and is referred to as the bit modulator register pair. The bit modulator register pair includes a first 16-bit register 40 or COUNT register which holds the number of cycles or the amount of time the carrier cycle pair will execute. A second 16-bit register 42 or WAIT register holds the time in system clock ticks between the end of the carrier and the start of the next carrier.

The carrier cycle register pair and the bit modulator register pair are connected to buffers 46, which are connected to an 8-bit data bus 48. The buffers 46 permit preloading while a prior IR sequence is still in process. The registers are also connected to control logic 50, which is controlled through lines 52 and 56 and sends signals out through line 54. A clock 58 is connected through line 56. An IR amplifier 64 is connected to the control logic 50 and to an infrared light emitting diode 66.

IR codes employ different IR bit modulation schemes including flash, biphase, variable space, variable mark, variable carrier, variable function, pulse position, missing pulse, and the like, to send control information to the consumer electronic devices. All the known IR codes and their different bit modulation schemes can be replicated by just two pairs of double-buffered data registers 34, 36, 40, 42, and 46 driven by host software on a PC or any other processor and its system clock 58.

In operation, when the ON register 34 is active, the IR amplifier 64 is also on. When the OFF register 36 is active, the IR amplifier 64 is off. The ON register 34 is initially loaded with a count that represents the number of clock ticks during which the IR light is on during each carrier cycle. Similarly, the OFF register 36 is loaded with the off time in clock ticks. The separate registers 34 and 36 provide for an accurate duty cycle. Duty cycle is defined as the percentage of time that the IR light is on during one cycle of a carrier frequency transmission compared to the time of one complete carrier cycle.

The carrier cycle register pair 34 and 36 can recreate any of the above identified bit modulation schemes. For the flash modulation scheme, which has no carrier, the carrier cycle registers pairs can be set at specific values to accommodate this special case.

After the ON register 34 is loaded with the count and the OFF register 36 is loaded with its count, the COUNT register 40 is loaded with the number of cycles the carrier cycle registers 34 and 36 will execute during each cycle burst and the WAIT register 42 is loaded with the pause time in clock ticks between cycle bursts.

After the system is initialized, the IR light is turned on and the ON register 34 starts counting down to zero. At zero, the IR light is turned off and the OFF register 36 is enabled The OFF register 36 starts counting down to zero and the ON register 34 is reloaded.

When the OFF register 36 counts down to zero, the COUNT register 40 is decremented. If the COUNT register 40 does not equal zero, then the ON register 34 is enabled, the OFF register 36 is reloaded, and the ON register 34 and OFF register 36 repeat the process and count down to zero again.

When the COUNT register 40 equals zero, the WAIT register 42 is enabled. A signal is sent from the control logic 50, while the WAIT register 42 is on and counting down to zero, indicating it is time to load a new bit. The carrier cycle registers and the bit modulator register are reloaded and the process repeats until all bits have been loaded from the software component 10.

The buffers 46 may be preloaded with the frequency, the number of cycles, and the wait time sent from the software component 10 positioned separate from said hardware component 14 while a prior IR sequence is still in process.

EXAMPLE

As an example of the operation, assume the system clock 58 is 20 MHz or one tick every 50 nanoseconds. It is desired to create a 40% duty cycle carrier frequency of 50 kHz. In this example, the ON register 34 will hold enough 50 nanosecond clock ticks to equal 40% of 20 microseconds, or 8 microseconds, which will be 160 ticks. Similarly, the OFF register 36 will hold 12 microseconds of clock ticks, or 240. When the system is initialized, the ON register 34 starts counting down to zero and the IR amplifier 64 is turned on. At zero, the OFF register 36 is enabled. The OFF register 36 begins to count down and the IR amplifier 64 is off. Also at this time, the ON register 34 is reloaded with its value of 160 so that it is ready for the next cycle. When the OFF register 36 counts down, the process is over.

At this point, the bit modulator register pair takes over. After the OFF register 36 has counted down to zero, the COUNT register 40 is decremented. If the COUNT register 40 is not zero, then the ON register 34 is enabled, the IR amplifier 64 is turned back on and the OFF register 36 is preloaded with its value, 240 in this example. Finally, when the COUNT register 40 equals zero, the WAIT register 42 is enabled. Since the carrier cycle pair is not operating at this time, the IR amplifier 64 is off.

While the WAIT register 42 is on and counting down to zero, a signal is sent from the control logic 50 through line 54 to the host processor (not shown) indicating it is time to load a new bit. If a new bit is loaded through the data lines 48 and strobed into the buffer 46 by line 52, reloading the carrier cycle register pair and the bit modulator register pair with new information, the whole operation repeats. If a new bit is not loaded, the operation halts at the end of the WAIT time.

This software process of configuring the data, then results in a series of numbers that are loaded into the specialized hardware component 14 in a specific sequence. For example, say the host processor will cause the transmission to send a digital one, followed by a digital zero, terminated by a stop bit. Furthermore, in this example, lets say the correct transmission employs a variable space bit modulator, the frequency and duty cycle are 50 kHz and 40%, as above, the number of carrier cycles is 20, the amount of wait time for a one and a zero are 1 millisecond and 2 milliseconds, respectively, and the stop bit is 20 cycles. The clock remains at 20 MHz.

To start the process, the host processor software loads the ON and OFF registers 34 and 36 with the frequency information (ON=160 and OFF=240), loads the COUNT register 40 with 20 and the WAIT register 42 with 20,000, the number of 20 MHz ticks in one millisecond. The hardware starts sending the carrier, the first 20 cycles using the ON, OFF and COUNT registers 34, 36 and 40. When WAIT is energized, the data for the next bit is loaded. The only real change is to WAIT. The WAIT buffer 42 is preloaded with 40,000, the number of system clock ticks in two milliseconds.

When the WAIT register 42 is finished, the ON and OFF registers 34 and 36 begin the carrier again. When the WAIT register is energized, the next bit is loaded. Since it is a stop bit in this example, the WAIT buffer 42 is preloaded with a zero. The carrier is sent one more time, then the process stops. In summary, the series of numbers loaded into the hardware component 14 to send a digital 1 and 0 via, in this example, variable-space modulated IR was: 160, 240, 20, 20 000, 160, 240, 20,40 000, 160, 240, 20, 0.

Finally, a variation of the process might include slightly more developed hardware, enhanced in structure, that could relieve the software of some processing overhead. For example, the control logic could be increased by the addition of logic that could replicate the few bit modulation schemes in use or could generate frequencies based on a number representing the period and another number representing the duty cycle. If bit modulators were transferred to the control logic, the software could signify which bit modulation scheme to use and then pass less data to the hardware by ignoring all the values that do not change between bits of an infrared transmission, such as the carrier cycle data, frequency and the like.

In the earlier example, the data could be reduced to 1, 160, 240, 20, 20 000, 40 000, 10 in which the first digit specifies the bit modulation scheme, followed by the frequency data, the COUNT and WAIT register data, and the two data bits to be sent. While not fully minimized in hardware, this approach represents a minimization that falls within the spirit of the invention.

By this process, a host computer can send any consumer IR transmission for which it is programmed. The hardware component 14 can be implemented as a simple outboard integrated circuit or imbedded within the processor, itself The hardware is reduced to a minimum amount necessary to transmit accurate and high speed IR codes. The software is maximized and expanded to hold all the known function data codes, all the known consumer IR protocols and the information whereby this data can be configured to execute on the minimized hardware.

An advantage is that software is less expensive to replicate, upgrade and enhance than the hardware. By separating the software component from the hardware component, the software can be updated without having the cost of replacing the hardware. A greater volume of codes can be stored or downloaded, improving the percentage that a consumer's electronic device's codes are stored in memory for use compared to that of a universal remote control.

Another advantage of the minimized hardware component 14 is that the depth of each register is doubled to accommodate synchronous loading of the next signal while the first is being sent. Another advantage of the hardware component 14 is its low cost to implement, due to its minimization.

Thus there has been shown and described a novel process and apparatus for maximizing the software component and minimizing the hardware component of an infrared code which fulfills all the objects and advantages sought therefor.

Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A minimized hardware for transmitting an infrared code, comprising:

control logic;

a clock connected to said control logic;

an IR amplifier connected to said control logic;

an IR light emitting diode connected to said IR amplifier for emitting IR light;

a pair of carrier cycle registers connected to said control logic including a first carrier cycle register to hold a number that represents a carrier frequency and a second carrier cycle register to hold a number that represents a duty cycle; and a pair of bit modulation registers connected to said carrier cycle registers for holding a wait time.

2. The minimized hardware according to claim 1, wherein said pair of carrier cycle registers includes an ON register and an OFF register, said ON register holds a count that represents a number of clock ticks during which said IR light is on during each carrier cycle and said OFF register holds a count that represent a number of clock ticks during which said IR light is off during each carrier cycle.

3. The minimized hardware according to claim 1, wherein said pair of bit modulator registers includes a COUNT register and a WAIT register, said COUNT register holds cycle data and said WAIT register holds said wait time.

4. The minimized hardware according to claim 1, further comprising at least one buffer connected to said carrier cycle registers and to said bit modulation registers for enabling preloading of said buffer while a prior IR transmission is still in process within said carrier cycle registers and said bit modulation registers.

5. The minimized hardware according to claim 1, further comprising an I/O pin connected to said control logic for relaying an IR out signal.

6. A process for using a maximized software component to drive a minimized hardware component to generate an infrared code, comprising the steps of:

(a) preloading at least one buffer connected to a pair a carrier cycle registers and to a pair of bit modulation registers of said hardware component with frequency, number of cycles, and wait time sent from said software component of said IR code;

(b) loading an ON register of said carrier cycle registers with a count that represents a number of clock ticks during which an IR light is on during each carrier cycle;

(c) loading an OFF register of said carrier cycle registers with a count that represents a number of clock ticks during which an IR light is off during each carrier cycle;

(d) loading a COUNT register of said bit modulator registers with cycle data;

(e) loading a WAIT register of said bit modulator registers with a time in clock ticks between an end of a signal and the start of a next signal;

(f) initializing the system;

(g) turning on an IR light and said ON register counting down to zero;

(h) turning off said IR light when said ON register is at zero;

(i) enabling said OFF register when said ON register is at zero and said OFF register counting down to zero;

(j) decrementing said COUNT register when said OFF register is at zero;

(k) enabling said ON register if said COUNT register does not equal zero;

(l) enabling said WAIT register when said COUNT register equals zero;

(m) sending a signal from control logic, while said WAIT register is on and counting down to zero, indicating it is time to load a new bit; and (n) reloading said carrier cycle registers and said bit modulator registers and repeating steps (a–m) until all bits have been loaded from said software component and sent by said hardware component.

7. The process according to claim 6, further comprising the step of reloading said ON register after step (i) of enabling said OFF register.

8. The process according to claim 6, further comprising the step of reloading said OFF register after step (k) of enabling said ON register.

* * * * *